United States Patent
Ra et al.

(10) Patent No.: US 9,185,035 B2
(45) Date of Patent: Nov. 10, 2015

(54) APPARATUS AND METHOD FOR PROCESSING PACKET IN MPLS-TP NETWORK

(71) Applicant: Electronics and Telecommunications Research Institute, Daejeon-si (KR)

(72) Inventors: Yong-Wook Ra, Daejeon-si (KR); Tae-Kyu Kang, Daejeon-si (KR); Chang-Ho Choi, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 165 days.

(21) Appl. No.: 13/846,016

(22) Filed: Mar. 18, 2013

(65) Prior Publication Data

US 2013/0287027 A1    Oct. 31, 2013

(30) Foreign Application Priority Data

Apr. 27, 2012  (KR) .......................... 10-2012-0044926

(51) Int. Cl.
*H04L 12/741* (2013.01)
*H04L 12/723* (2013.01)

(52) U.S. Cl.
CPC .............. *H04L 45/745* (2013.01); *H04L 45/50* (2013.01); *H04L 45/507* (2013.01)

(58) Field of Classification Search
CPC . H04L 12/4641; H04L 12/18; H04L 12/5689; H04L 45/745; H04L 45/507; H04L 45/50
See application file for complete search history.

(56) References Cited

U.S. PATENT DOCUMENTS

| | | | |
|---|---|---|---|
| 7,633,954 B2 | 12/2009 | Wakayama et al. | |
| 2005/0008009 A1* | 1/2005 | Chen et al. | 370/360 |
| 2005/0125490 A1* | 6/2005 | Ramia | 709/202 |
| 2007/0133559 A1* | 6/2007 | Ko et al. | 370/395.21 |
| 2008/0212595 A1* | 9/2008 | Figueira et al. | 370/401 |
| 2012/0163165 A1* | 6/2012 | Ra et al. | 370/225 |

* cited by examiner

*Primary Examiner* — Jianye Wu

(74) *Attorney, Agent, or Firm* — Nelson Mullins Riley & Scarborough LLP; Anthony A. Laurentano, Esq.; Lewis Lee, Esq.

(57) ABSTRACT

An apparatus and method for processing a packet in a multi-protocol label switching-transport profile (MPLS-TP) network are provided. In the method of processing a packet, a packet transport layer (PTL) index and a layer stack (LS) or multiple label pop (MPOP) loopback header are used, and it is possible to remove a size limitation on lookup results of a lookup table when multiple labels are stacked, and solve the problem of having to extract all labels as label keys regardless of label operations upon an incoming label map (ILM) table lookup.

18 Claims, 14 Drawing Sheets

| Copies Numbers (2 bytes) | Original Source Port (1 bytes) | Next PTL Index/Indicator (3 bytes) | Original L2 Header Size (2 bytes) | Added L2 Header & MPLS Label Size (1byte) | Existing Swapped Label (1byte) | Reserved (1byte) |

620

| Copies Numbers (2 bytes) | Original Source Port (1 bytes) | Reserved (3 bytes) | Original L2 Header Size (2 bytes) | Added L2 Header & MPLS Label Size (1byte) | More Pop Control byte (1byte) | Pop Label Numbers (1byte) |

FIG. 7A

FTN Table (Port + C-VID & Port + C-VID + E-Type)

710

| Keys | | | | Results Field | | |
|---|---|---|---|---|---|---|
| Port | C-VID | Control Field | Search control Field | PTL Index | PTL Index Indicator | Encapsulation Label |
| 1 | 0×102 | 0×4700 | 0×01 | 0×0004 | 0×00 | - |
| 2 | 0×202 | 0×4700 | 0×01 | 0×0008 | 0×00 | - |
| 3 | 0×302 | 0×4700 | 0×01 | 0×0012 | 0×00 | - |

720

| Keys | | | | Results Field | | | |
|---|---|---|---|---|---|---|---|
| Port | C-VID | E-Type | Control Field | Search control Field | PTL Index | PTL Index Indicator | Encapsulation Label |
| 1 | 0×102 | 0×0800 | 0×4700 | 0×01 | 0×0104 | 0×00 | 0×00800? |
| 2 | 0×202 | 0×0800 | 0×4700 | 0×01 | 0×0108 | 0×00 | 0×00800? |
| 3 | 0×302 | 0×86DD | 0×4700 | 0×01 | 0×0112 | 0×00 | 0×086DD? |

FIG. 7B

PW FTN Table (Port + C-VID)

| Keys | | Results Field | | | | |
|---|---|---|---|---|---|---|
| Port | C-VID | Control Field | Search control Field | PTL Index | PTL Index Indicator | New VID for SDT Modification |
| 1 | 0x102 | 0x2709 | 0x01 | 0x3004 | 0x00 | 0x0E01 |
| 2 | 0x202 | 0x2709 | 0x01 | 0x3008 | 0x00 | 0x0E02 |
| 3 | 0x302 | 0x2709 | 0x01 | 0x3012 | 0x00 | 0x0E03 |

ILM Table 740

| Keys | | | | Results Field | | | |
|---|---|---|---|---|---|---|---|
| Port | Label | Control Field | Search control Field | PTL Index | PTL Index Indicator | E-Type | Packet counter Index |
| 7 | 0x00100 | 0x5780 | 0x09 | 0x1004 | 0x00 | 0x0800 | 0x000001 |
| 7 | 0x00200 | 0x5780 | 0x09 | 0x1008 | 0x00 | 0x0800 | 0x000002 |
| 7 | 0x00300 | 0x5780 | 0x09 | 0x1012 | 0x00 | 0x0800 | 0x000003 |
| 8 | 0x00400 | 0x5780 | 0x09 | 0x2008 | 0x00 | 0x0800 | 0x000004 |
| 9 | 0x00500 | 0x5780 | 0x09 | 0x2016 | 0x00 | 0x0800 | 0x000005 |
| 7 | 0x00600 | 0x9780 | 0x21 | 0x2012 | 0x00 | 0x0800 | 0x000006 |
| 8 | 0x00700 | 0x9780 | 0x21 | 0x3008 | 0x00 | 0x0800 | 0x000007 |
| 9 | 0x00800 | 0x9780 | 0x21 | 0x3012 | 0x00 | 0x0800 | 0x000008 |
| 9 | 0x00900 | 0x4780 | 0x41 | 0x4012 | 0x00 | - | 0x000009 |

NHLFE Table 751

750a

| Keys | | | | Results Field (1) | | | | |
|---|---|---|---|---|---|---|---|---|
| PTL Index | Control Field | Search control Field | Queue Index | TB Index | Next PTL Index (2B) & Indicator (1B) | Second Tag | First Tag | Packet counter Index |
| 0x000400 | 0x5702 | 0x31 | 0xE107 | 0xC0D50E | 0x1004 | - | - | 0x000001 — 752a |
| 0x010400 | 0x5702 | 0x31 | 0xE207 | 0xC0D50E | 0x2008 | - | - | 0x000004 |
| 0x201200 | 0x4700 | 0x01 | 0xE307 | 0xC0D50E | - | 0x88A80123 | 0x81000456 | 0x000006 — 753a |
| 0x300800 | 0x4700 | 0x01 | 0xE407 | 0xC0D50E | - | - | 0x87000789 | 0x000007 |
| 0x401200 | 0x5702 | 0x31 | 0xE507 | 0xC0D50E | - | - | - | 0x000009 — 754a |

750b

| Keys | | | Results Field (2) | | | | | |
|---|---|---|---|---|---|---|---|---|
| PTL Index | 2nd Control Field | D-MAC | Swap Label | 4th Label (EXP/S/TTL) | 3rd Label (EXP/S/TTL) | 2nd Label (EXP/S/TTL) | 1st Label (EXP/S/TTL) | |
| 0x000400 | 0x17DC | 0x300400A42140 | - | 0x010230FF | 0x100C10FF | 0x104C00FF | 0x004C01FF | — 752b |
| 0x010400 | 0x179C | 0x300400A42142 | - | - | 0x002230FF | 0x105800FF | 0x005801FF | |
| 0x201200 | 0x1702 | 0x300400A42144 | - | - | - | - | - | — 753b |
| 0x300800 | 0x1702 | 0x300400A42146 | - | - | - | - | - | |
| 0x401200 | 0x178D | 0x300400A42148 | 0xAABB10 | 0x110230FF | 0x100810FF | 0x108000FF | 0x002000FF | — 754b |

APPARATUS AND METHOD FOR PROCESSING PACKET IN MPLS-TP NETWORK

CROSS-REFERENCE TO RELATED APPLICATION

This application claims the benefit under 35 U.S.C. §119 (a) of a Korean Patent Application No. 10-2012-0044926, filed on Apr. 27, 2012, the entire disclosure of which is incorporated herein by reference for all purposes.

BACKGROUND

1. Field

The following description relates to multi-label processing technology in a multi-protocol label switching-transport profile (MPLS-TP) network, and more particularly, to an apparatus and method for processing a packet in an MPLS-TP network.

2. Description of the Related Art

Due to an increase in data traffic caused by the proliferation of the Internet and the combination of the wired and wireless Internet, existing complex networks have limitations to accommodate a high-quality service such as Internet protocol (IP) television (TV). Thus, methods have been researched for transmission service of providing expandability and end-to-end quality of service (QoS) using the data link layer such as MPLS-TP of the International Engineering Task Force (IETF), Institute of Electrical and Electronics Engineers (IEEE) 802.1ah (provider backbone bridges (PBB)) and IEEE802.1ag (PBB-traffic engineering (TE)).

Among the methods, an MPLS-TP network includes an ingress provider edge (PE) node that is located at a boundary point with an existing network, generates an MPLS-TP packet by attaching a label to an input packet, and forwards the generated MPLS-TP packet into an MPLS-TP network, an egress PE node that disconnects an MPLS-TP connection for transmission from the MPLS-TP network to another existing network, and a transit provider (P) node that performs a label switching function.

Due to a limitation on the size of a lookup table, an existing MPLS-TP network has a limitation on a label stack when multiple labels are stacked. In addition, when a lookup is performed for multi-label processing, stack bits need to be continuously checked to generate a label key. Furthermore, all MPLS labels, even including labels that are not used in a specific node, need to be extracted as label keys regardless of label operations such as swap, push, swap and push, and pop, which is complicated and may deteriorate performance.

SUMMARY

The following description relates to a packet processing method and apparatus for removing a size limitation on a lookup table when multiple labels are stacked, and solving the problem of having to extract all labels as label keys regardless of label operations upon a lookup of a lookup table.

In one general aspect, a method of processing a packet in a multi-protocol label switching-transport profile (MPLS-TP) network includes: classifying an input packet, and extracting or generating at least a packet transport layer (PTL) index through a lookup according to the classification result; performing a lookup for determining a next hop using the extracted or generated PTL index, and acquiring service-specific lookup results; and processing the packet according to the acquired service-specific lookup results, and transmitting the packet.

The extracting or generating of at least the PTL index may include: when the classification result indicates that the input packet is an MPLS packet, performing an MPLS incoming label map (ILM) table lookup; when the input packet is an Ethernet packet including no tag, a customer (C)-tag or a service (S)-tag, and a pseudo-wire (PW) control signal is in an inactive state, performing a forwarding equivalence class (FEC)-to-next hop label forwarding entry (NHLFE) map (FTN) table lookup; and when the input packet is an Ethernet packet including no tag, a C-tag or an S-tag, and the PW control signal is in an active state, performing a PW FTN table lookup.

The performing of the MPLS ILM table lookup may include performing the MPLS ILM table lookup using input port information and MPLS label information to acquire lookup results, and acquiring the PTL index that is a parameter value for ensuring a label switched path (LSP) and quality of service (QoS), a service delimiting tag (SDT), a new tag, MPLS control information, and tag control information for other control from the acquired lookup results.

The performing of the FTN table lookup may include performing the FTN table lookup using input port information, customer virtual local area network (VLAN) identifier (C-VID) information, service provider VLAN ID (S-VID) information, source media access control (S-MAC) address information, and ether (E)-type information to acquire lookup results, and acquiring other control signals including the PTL index and encapsulation LSP (ELSP) validity information, and an ELSP label from the acquired lookup results.

The performing of the PW FTN table lookup may include performing the PW FTN table lookup using input port information, C-VID information and S-VID information to acquire lookup results, and acquiring the PTL index that is a parameter value for ensuring the LSP and QoS, and tag control information for other control.

The performing of the lookup for determining the next hop may include performing an NHLFE table lookup using the PTL index to acquire lookup results, and acquiring at least one of traffic manager (TM) header information, switching fabric and output port (O-port) information, tag value information, TM queue index information, tag control information, information on a service LSP (SLSP) label related to an MPLS-TP layer, transport LSP (TLSP) label information, experimental (EXP) information, stack bit information, time-to-live (TTL) information, PTL index information, a destination MAC (D-MAC) ID or a multicast ID (M-ID), and label control information using the PTL index.

The processing of the packet according to the acquired service-specific lookup results, and the transmitting of the packet may include encapsulating, decapsulating, or replacing MPLS-TP layer labels, inserting a tag according to a configuration of a destination network, and inserting, removing, or modifying a tag according to an SDT upon provision of PW adaptation service so that the packet can be transmitted to a destination edge node through the LSP in the MPLS-TP network.

The processing of the packet according to the acquired service-specific lookup results, and the transmitting of the packet may include generating a layer stack (LS) loopback header or a multiple label pop (MPOP) loopback header according to the acquired service-specific lookup results, and transmitting the packet.

The generating of the LS loopback header or the MPOP loopback header, and the transmitting of the packet may include: checking whether the input packet is a multicast packet, transmitting the packet after extracting an O-port group from the input packet and extracting O-port-specific PTL indexes through loopback when the input packet is a multicast packet, and checking whether an LS has been generated when the input packet is not a multicast packet; and when it is checked that an LS has been generated, transmitting the packet after generating the LS loopback header, encapsulating the generated LS loopback header, and extracting a next PTL index, and when it is checked that no LS has been generated, checking whether a label operation is a label pop operation.

The generating of the LS loopback header or the MPOP loopback header, and the transmitting of the packet may further include: when the label operation is a label pop operation, checking whether the number of labels on which the label pop operation is performed exceeds a predetermined number, and when the number exceeds the predetermined number, updating a layer 2 (L2) header and transmitting the packet after generating the MPOP loopback header, extracting an additional label key, and performing an ILM lookup using the extracted label key; and when the label operation is not a label pop operation, performing a hash table lookup for ensuring QoS, updating an MPLS-TP header according to each label operation, updating the L2 header, and transmitting the packet.

The method may further include, when the input packet is a control packet, processing the control packet, and transmitting the processed control packet to a central processing unit (CPU), wherein the processing of the control packet, and the transmitting of the processed control packet to the CPU may include, when the input packet is an MPLS-TP operation, administration and maintenance (OAM) packet among control packets, performing OAM packet processing, and then transmitting the MPLS-TP OAM packet to the CPU.

The method may further include, when the input packet is a transmission packet, selecting an egress provider edge (PE) node, and outputting the input packet through the selected egress PE node.

The outputting of the input packet may include: determining whether an output node is a network-to-network interface (NNI) node or a user-to-network interface (UNI) node, and selecting the egress PE node; when the output node is an NNI node, extracting an O-port and an MPLS-TP top label, and performing an NNI table lookup, and when the input packet is a multicast packet, extracting an O-port group, and then outputting the packet; and when the output node is not a UNI node, extracting an O-port and a PTL index, and performing a UNI table lookup, and when the input packet is a multicast packet, extracting an O-port group, and then outputting the packet.

In another general aspect, an apparatus for processing a packet in an MPLS-TP network includes: a packet classifier configured to classify an input packet; a lookup unit configured to extract or generate at least a PTL index by performing a lookup according to the classification result, and acquire service-specific lookup results by performing a lookup for determining a next hop using the extracted or generated PTL index; and a packet processor configured to process the packet according to the acquired service-specific lookup results, and transmit the packet through an LSP.

The packet classifier may analyze and classify the input packet as a control packet or a general packet, and classify a service type of the transmission packet with reference to a type field, an S-MAC address, a C-VLAN tag, an S-VLAN tag, MPLS label and input port information, and predetermined port-specific service configurations.

The lookup unit may include an ILM lookup unit configured to generate and manage service using the input port information and MPLS label information extracted by the packet classifier, and acquire the PTL index that is a parameter value for ensuring the LSP and QoS, an SDT, a new tag, MPLS control information, and tag control information for other control through an MPLS ILM table lookup.

The lookup unit may include an FTN lookup unit configured to generate and manage service using at least one of input port information, a C-VID, an S-VID, an S-MAC address, and E-type information extracted by the packet classifier, and acquire other control signals including the PTL index that is a parameter value for ensuring the LSP and QoS, and ELSP validity information, and an ELSP label through an FEC table lookup.

The lookup unit may include a PW FTN lookup unit configured to generate and manage service using at least one of input port information, C-VID information and S-VID information extracted by the packet classifier, and acquire the PTL index that is a parameter value for ensuring the LSP and QoS, and tag control information for other control through a PW FEC table lookup.

The lookup unit may include an NHLFE lookup unit configured to generate and manage service using the PTL index as key information, and acquire at least one of TM header information, switching fabric and O-port information, tag value information, TM queue index information, tag control information, information on an SLSP label related to an MPLS-TP layer, TLSP label information, EXP information, stack bit information, TTL information, PTL index information, D-MAC ID or M-ID information, and label control information through an NHLFE table lookup.

The apparatus may further include a loopback control manager configured to generate an LS loopback header when the apparatus is located in a plurality of MPLS-TP domains, and an MPLS-TP LS is generated, and generate an MPOP loopback header when an MPOP operation occurs.

Other features and aspects will be apparent from the following detailed description, the drawings, and the claims.

BRIEF DESCRIPTION OF THE DRAWINGS

FIG. 6 shows examples of the header configuration of a packet generated by a loopback control manager of FIG. 4 according to an embodiment of the present invention.

FIG. 7A to FIG. 7D are reference diagrams showing lookup tables used by a packet processing apparatus according to various embodiments of the present invention.

Figure 1:
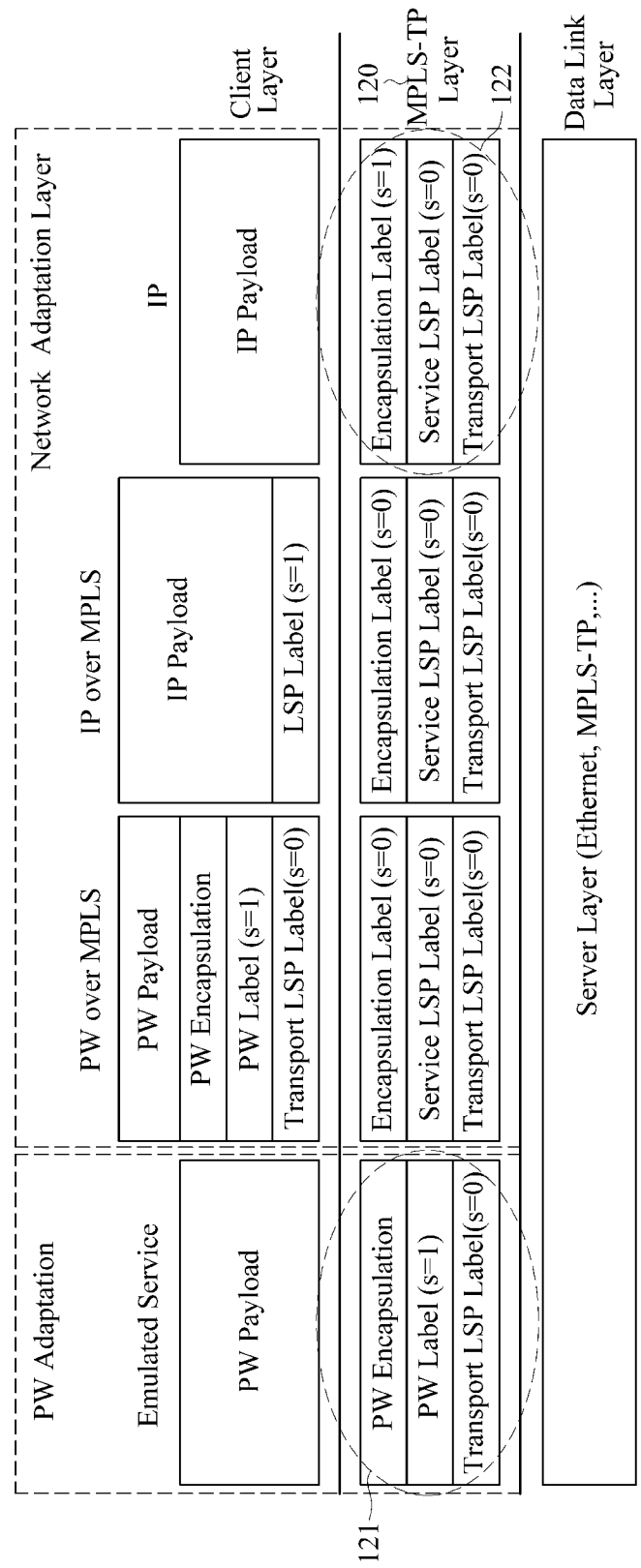
FIG. 1 is a reference diagram illustrating client service provided according to a multi-protocol label switching-transport profile (MPLS-TP) standard by a packet processing apparatus according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a reference diagram illustrating client service provided according to a multi-protocol label switching-transport profile (MPLS-TP) standard by a packet processing apparatus according to an embodiment of the present invention.

An MPLS-TP network includes an ingress provider edge (PE) node that is located at a boundary point with an existing network, generates an MPLS-TP packet by attaching a label to an input packet, and forwards the generated MPLS-TP packet to the MPLS-TP network, an egress PE node that disconnects an MPLS-TP connection for transmission from the MPLS-TP network to another existing network, and a transit provider (P) node that performs a label switching function. Here, the ingress PE node, the egress PE node, and the transit P node correspond to a packet processing apparatus according to an embodiment of the present invention.

The packet processing apparatus generates and manages a label switched path (LSP) dynamically added by a method or a link state protocol provisioned in advance with a different packet processing apparatus. Also, the packet processing apparatus transmits packets input from a plurality of local networks, provider bridge (PB) networks, and MPLS networks to another network through the generated LSP.

Referring to FIG. 1, in connection with the MPLS-TP standard, labels of an MPLS-TP layer 120 may be classified into labels of a pseudo-wire adaptation layer (PWAL) 121 and labels of a network adaptation layer (NAL). A basic label structure is service LSP (SLSP)/transport LSP (TLSP), SLSP/TLSP/TLSP, encapsulation LSP (ELSP)/SLSP/TLSP, or a structure in which a plurality of TLSPs can be stacked on the aforementioned stacks. An ELSP may be selectively used according to a service type. A layer stack (LS) mentioned in the present invention denotes a stack of all basic labels of the aforementioned MPLS-TP layer, and an MPLS label stack denotes a stack of only TLSPs made using label control information.

Figure 2:
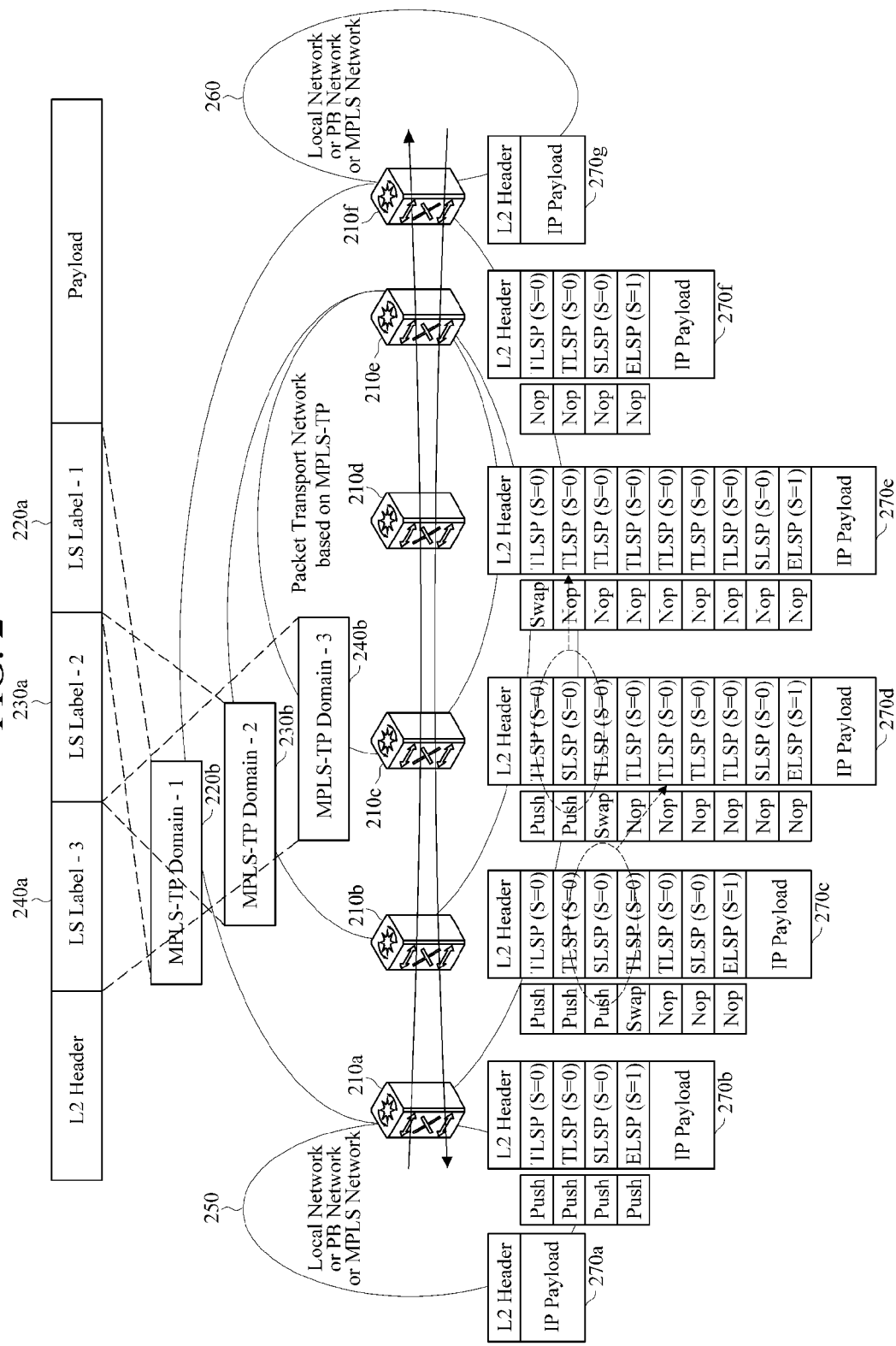
FIG. 2 is a reference diagram showing a packet transport network structure including a packet processing apparatus according to an embodiment of the present invention.

FIG. 2 is a reference diagram showing a packet transport network structure including a packet processing apparatus according to an embodiment of the present invention.

In FIG. 2, a plurality of packet processing apparatuses 210a to 210f are distinguished from each other for convenience of description, and are identical to a packet processing apparatus according to an embodiment of the present invention. The packet processing apparatuses 210a to 210f generate and manage an LSP tunnel dynamically added by a method or a link state protocol provisioned in advance with a different packet processing apparatus. Also, the packet processing apparatuses 210a to 210f transmit packets input from a plurality of local networks, PB networks, and MPLS networks through the generated LSP tunnel. Packets transmitted through the plurality of packet processing apparatuses 210a to 210f consist of a layer 2 (L2) header, an LS label, and a payload. Here, the LS label may be configured according to MPLS-TP domains, and includes, for example, an LS label 1 240a, an LS label 2 240b and an LS label 3 240c as shown in FIG. 2.

For NAL service, a packet processing apparatus according to an embodiment of the present invention uses an incoming label map (ILM) lookup function and a forwarding equivalence class (FEC)-to-next hop label forwarding entry (NHLFE) map (FTN) lookup function. In the present invention, a lookup denotes an operation of searching a lookup table using information obtained by analyzing an input packet to find the corresponding LSP tunnel information.

Service employing the FTN lookup function uses port-based service in which input port and customer (C)-tag information, input port and service (S)-tag information, or only input port information is used, and uses an input port and an FEC such as a source media access control (S-MAC) address. The presence or absence of an ELSP in a packet transport frame is determined according to whether or not to use ether (E)-type in addition to the aforementioned basic information so as to determine a service type. When outputting a packet, each packet processing apparatus may additionally encapsulate a C-tag or an S-tag that is an L2 tag with reference to add, remove or modify information that is L2 tag control information.

Service employing the ILM lookup function determines a next hop using input port and MPLS label information when a PW-over-MPLS or Internet protocol (IP)-over-MPLS packet is input.

Meanwhile, PWAL service determines a next hop using port-based service in which input port and C-tag information, input port and S-tag information, or only input port information is used. An LS of the PWAL service consists of PW encapsulation, a PW label, and a TLSP (see 121 of FIG. 1), on which a TLSP label can be additionally stacked according to components of an internal MPLS-TP network. According to a destination network, a packet processing apparatus determines whether or not to insert/remove/modify a C-tag and an S-tag, which are L2 tags, using service delimiting tag (SDT) control information in two PW modes (a raw mode and a tagged mode), updates a transmission packet header, and transmits an output frame 270g to a customer edge node 260 which is a destination.

Referring to FIG. 2, a structure of LS labels 220a, 230a and 240a shows an MPLS-TP header structure in which MPLS-TP layers are stacked, and a transmission packet including the MPLS-TP header may be transmitted via a network consisting of MPLS-TP domains 220b, 230b and 240b. In FIG. 2, reference numeral 210a denotes an ingress PE node capable of stacking MPLS-TP layers, and the nodes 210b and 210c are ingress PE nodes when MPLS-TP layers are stacked, and transit P nodes when MPLS labels are stacked. The node 210d is administered as a transit P node. The nodes 210e and 210f denote egress PE nodes, and decapsulate MPLS-TP LS labels. Together with the node 210f, the node 210e of FIG. 2 may decapsulate MPLS-TP layer labels of MPLS-TP domain 2 and domain 3, output a transmission packet, and apply multiple label pop (MPOP) according to structures of LSs of the respective MPLS-TP domains. An SLSP 280a generated when layers of an output frame 270b are stacked by the node 210b is input to the node 210c and recognized as a TLSP when an ILM lookup is performed, and an SLSP 280b generated when layers of an output frame 270d are stacked by the node 210c is also input to the node 210d and recognized as a TLSP.

No operation (NOP) labels stacked under a swap label are not extracted as keys for an ILM lookup.

Figure 3:
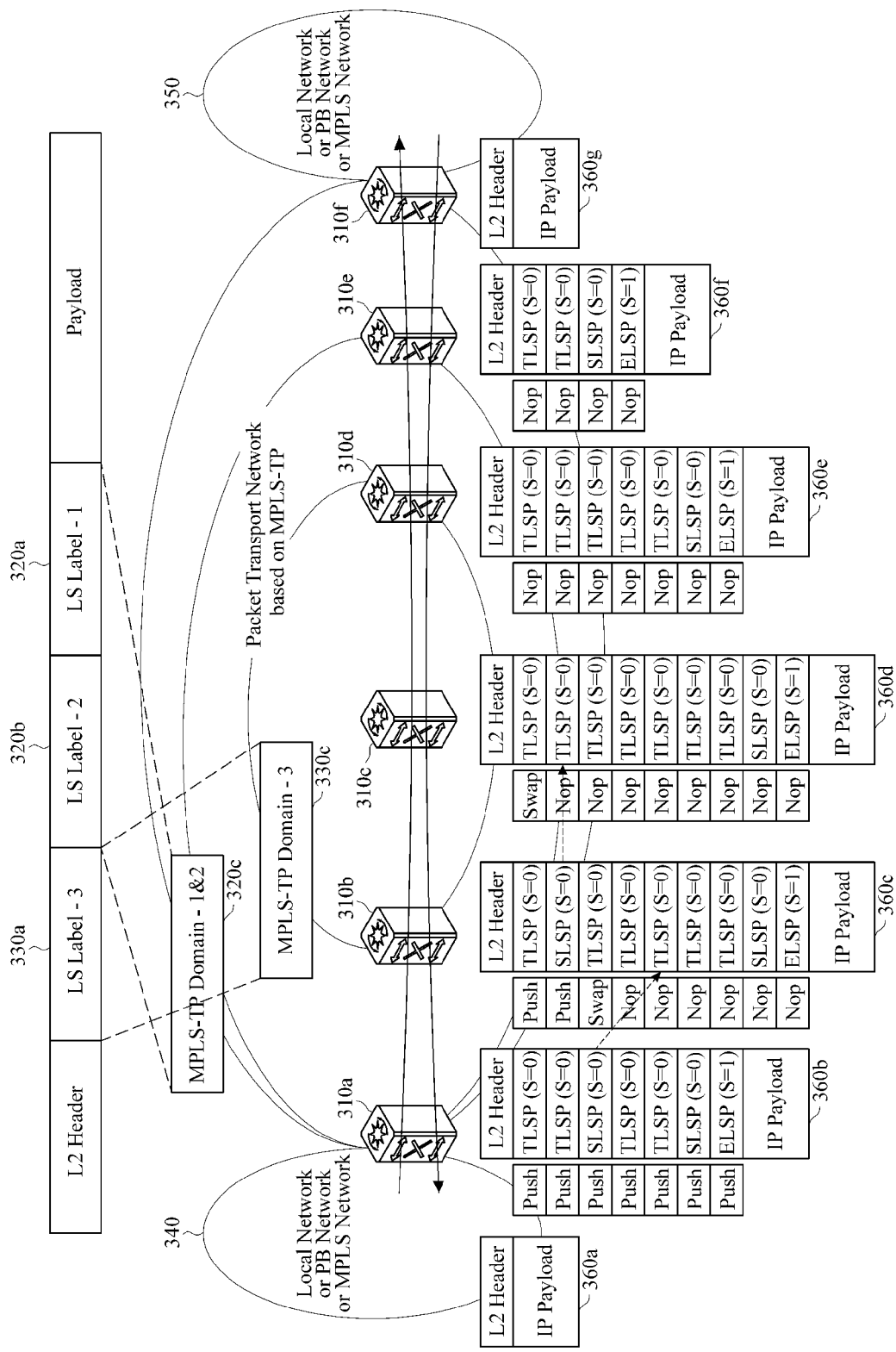
FIG. 3 is a reference diagram showing a packet transport network structure including a packet processing apparatus according to another embodiment of the present invention.

FIG. 3 is a reference diagram showing a packet transport network structure including a packet processing apparatus according to another embodiment of the present invention.

In FIG. 3, a plurality of packet processing apparatuses 310a to 310f are identical to a packet processing apparatus according to an embodiment of the present invention, and are distinguished from each other for convenience of description. The packet processing apparatuses 310a to 310f function to generate and manage an LSP tunnel dynamically added by a method or a link state protocol provisioned in advance with a different packet processing apparatus. Also, the packet processing apparatuses 310a to 310f transmit packets input from a plurality of local networks, PB networks, and MPLS networks through the generated LSP tunnel.

Referring to FIG. 3, a structure of LS labels 320a, 320b and 330a shows an MPLS-TP header structure in which MPLS-TP layers are stacked, and a transmission packet including the MPLS-TP header may be transmitted via a network consisting of MPLS-TP domains 320c and 330c. In FIG. 3, reference numeral 310a denotes an ingress PE node, performs transmission through two different MPLS-TP domains (MPLS-TP domain 1 and MPLS-TP domain 2), and thus is capable of stacking multiple MPLS-TP layers. The node 310b is an ingress PE node when MPLS-TP layers are stacked, and is administered as a transit P node when MPLS labels are stacked. The node 310c is administered as a transit P node. The nodes 310d, 310e and 310f are administered as egress PE nodes, and decapsulate a stack of MPLS-TP layers applied from the respective MPLS-TP domains 320c and 330c. The node 310a of FIG. 3 performs multi-encapsulation of MPLS-TP layers of MPLS-TP domain 1 and MPLS-TP domain 2.

Figure 4:
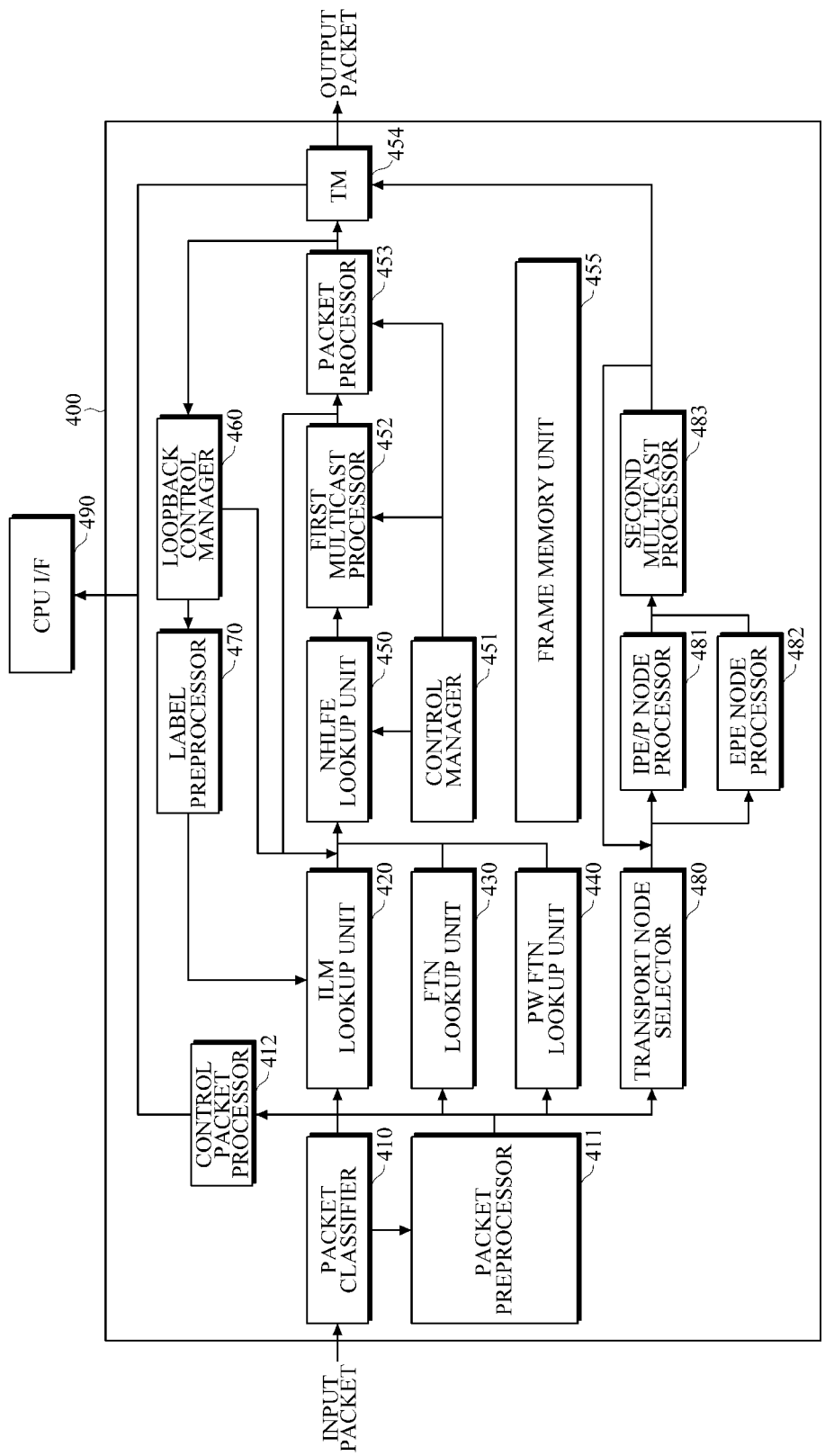
FIG. 4 is a block diagram of a packet processing apparatus according to an embodiment of the present invention.

FIG. 4 is a block diagram of a packet processing apparatus 400 according to an embodiment of the present invention.

Referring to FIG. 4, the packet processing apparatus 400 for transmitting a packet in an MPLS-TP network performs receiving, transmitting and common functions in packet transmission and reception.

To perform the receiving and common functions, the packet processing apparatus 400 includes a packet classifier 410, a packet preprocessor 411, an ILM lookup unit 420, an FTN lookup unit 430, a PW FTN lookup unit 440, an NHLFE lookup unit 450, a control manager 451, a first multicast processor 452, a packet processor 453, a traffic manager (TM) 454, a frame memory unit 455, a loopback control manager 460, and a label preprocessor 470.

To perform the transmitting function, the packet processing apparatus 400 includes a transport node selector 480, an ingress PE/P node processor 481, an egress PE node processor 482, and a second multicast processor 483.

The components of the packet processing apparatus 400 will be described in detail below.

The packet classifier 410 analyzes packets input from a local network, a PB network, an MPLS network or a customer edge node to classify the input packets into control packets and general packets, and classifies service types of transmission packets with reference to type fields, S-MAC addresses, C-VLAN tags, S-VLAN tags, MPLS label and input port information, and predetermined port-specific service configurations of input packet headers.

The packet preprocessor 411 extracts Ethernet headers, MPLS labels, etc. that are key information to be used by the plurality of lookup units 420, 430 and 440 from the input packets according to the service types classified by the packet classifier 410.

The ILM lookup unit 420 generates and manages service using the input port information and MPLS label information, etc. extracted by the packet classifier 410, and acquires a packet transport layer (PTL) index that is a parameter value for ensuring an LSP and QoS, an SDT, a new tag, MPLS control information, and tag control information for other control through an MPLS ILM table lookup. The PTL index is used as key information for an NHLFE lookup in the NHLFE lookup unit 450 which will be described later.

The FTN lookup unit 430 generates and manages service using the input port information, customer virtual local area network (VLAN) identifier (C-VID) information, service provider VLAN ID (S-VID) information, S-MAC address information, E-type information, etc. extracted by the packet classifier 410, and acquires other control signals including a PTL index that is a parameter value for ensuring an LSP and QoS, and ELSP validity information, and an ELSP label through an FEC table lookup. The PTL index is used as key information for an NHLFE lookup in the NHLFE lookup unit 450 which will be described later.

The PW FTN lookup unit 440 generates and manages service using the input port information, the C-VID information, the S-VID information, etc. extracted by the packet classifier 410, and acquires information on a PTL index that is a parameter value for ensuring an LSP and QoS and used by the NHLFE lookup unit 450, and tag control information for other control through a PW FEC table lookup.

The NHLFE lookup unit 450 generates and manages service using the PTL indexes generated by the plurality of lookup units 420, 430 and 440, and acquires TM header information, switching fabric and output (O)-port information, tag value information, TM queue index information, tag control information, information on an SLSP label related to an MPLS-TP layer, TLSP label information, EXP information, stack bit information, time-to-live (TTL) information, PTL index information, destination (D)-MAC ID or multicast (M)-ID information, label control information, etc. through an NHLFE table lookup. Also, when an operation, administration and maintenance (OAM) continuity check message (CCM) packet or a path abnormality signal is received for protection switching, the NHLFE lookup unit 450 switches a currently served path to a protection path using PTL index indicator values of the plurality of lookup units 420, 430 and 440.

The control manager 451 manages various control signals such as a PW service enable signal, a multicast control signal, a multicast enable selection signal at a transmission/reception end, an MPLS-TP LS control signal, a label validity information signal for controlling a label stack (LS), a PW termination information signal, and a tag control information signal for supporting the raw mode and the tagged mode in PW adaptation, and transmits the control signals to the other blocks 450, 452, 453 and 483.

The packet processor 453 performs encapsulation, decapsulation, replacement, etc. functions such as push, swap, swap and push, and pop on MPLS-TP layer labels, and functions such as tag insertion according to a configuration of a destination network, and performs tag insertion/removal/modification according to an SDT upon provision of PW adaptation service, so that a packet can be transmitted to a destination edge node through a set LSP tunnel in an MPLS-TP network. Also, when a label operation of an MPLS-TP layer is a swap operation, the packet processor 453 may perform a function of decrementing a TTL field.

The frame memory unit 455 includes memories for storing the input packets processed by the packet processor 453 and performing header insertion/modification/removal functions and other functions.

The TM 454 performs color marking to perform selective discard of service that exceeds a threshold value set according to a QoS profile set from an upper control channel through a central processing unit (CPU) interface 490, and inserts a control signal so that service can be selectively discarded through a weighted random early discard (WRED) function. Also, the TM 454 selectively discards a packet to ensure QoS when a collision occurs, and designates and manages service-specific bandwidths. When new service exceeds a predetermined band of service, the TM 454 discards the new service to protect service that is already being provided and ensure QoS.

A control packet processor 412 looks up an OAM table and processes three types of OAM functions including SLSP OAM, TLSP OAM and PW OAM to sense an abnormality on a path, and periodically transmits and receives CCM packets. Also, the control packet processor 412 transmits packets other than CCM packets, for example, link trace message (LTM), link trace reply (LTR), and loopback message (LBM) packets, to an upper processor through the CPU interface 490, and then receives process results. In addition, the control packet processor 412 analyzes and transmits other control packets, such as a synchronous Ethernet (Sync-E) packet, etc. to a host.

The first multicast lookup unit 452 determines in which one of multicast and unicast techniques it will transmit a packet, using multicast ID (M-ID) information and a flag. When it is determined to transmit the packet in the multicast technique, the first multicast lookup unit 452 acquires a multicast port group through a multicast table lookup, and acquires D-MAC addresses, next PTL indexes, MPLS-TP layer labels, EXPs, stack bits, TTLs, L2 tag values, TM queue indexes and control information according to respective ports of the acquired port group.

The loopback control manager 460 generates an LS loopback header if an MPLS-TP LS is generated when the input packets pass through an ingress PE located in two or more MPLS-TP domains. Also, the loopback control manager 460 generates an MPOP loopback header if MPOP occurs when the input packets pass through an egress PE located in two or more MPLS-TP domains.

The label preprocessor 470 extracts a label generated using an additional key and checks whether the extracted label corresponds to an MPLS-TP OAM packet when the number of pop label operations performed when the input packets pass through an egress PE located in two or more MPLS-TP domains is a predetermined number (e.g., five) or more.

The transport node selector 480 checks whether a packet O-port is a network-to-network interface (NNI) direction port or a user-to-network interface (UNI) direction port, selects the ingress PE/P node processor 481 when the packet O-port is an NNI direction port, selects the egress PE node processor 482 when the packet O-port is a UNI direction port, and then extracts key information used by the respective processors 481 and 482 from the input packets.

When a packet is output in the NNI direction, the ingress PE/P node processor 481 updates an S-MAC address using the O-port and an uppermost TLSP label extracted by the transport node selector 480 as key values, and acquires a TM queue index for QoS shaping of an output end. When a PB network or a local network in an output MPLS-TP domain is in an intermediate path of the packet processing apparatus 400 according to the embodiment of the present invention, it is possible to encapsulate an L2 tag (C-tag or S-tag) for packet transport.

When a packet is output in the UNI direction, the egress PE node processor 482 updates an S-MAC address using the O-port and the PTL index extracted by the transport node selector 480 as key values, and acquires a TM queue index for QoS shaping of the output end. Also, it is possible to encapsulate an L2 tag (C-tag or S-tag) for packet transport according to the structure of an adjacent output network. When a PW is terminated before encapsulation, a PW L2 header (D-MAC and S-MAC) may be additionally decapsulated, and then the acquired information may be encapsulated.

The second multicast processor 483 determines whether to transmit a packet by multicast or unicast using M-ID information and a flag, acquires a multicast port group through a multicast table lookup, and acquires D-MAC addresses, MPLS-TP layer labels, EXPs, stack bits, TTLs, L2 tag values, TM queue indexes, and control information according to respective ports of the acquired port group.

Figure 5:
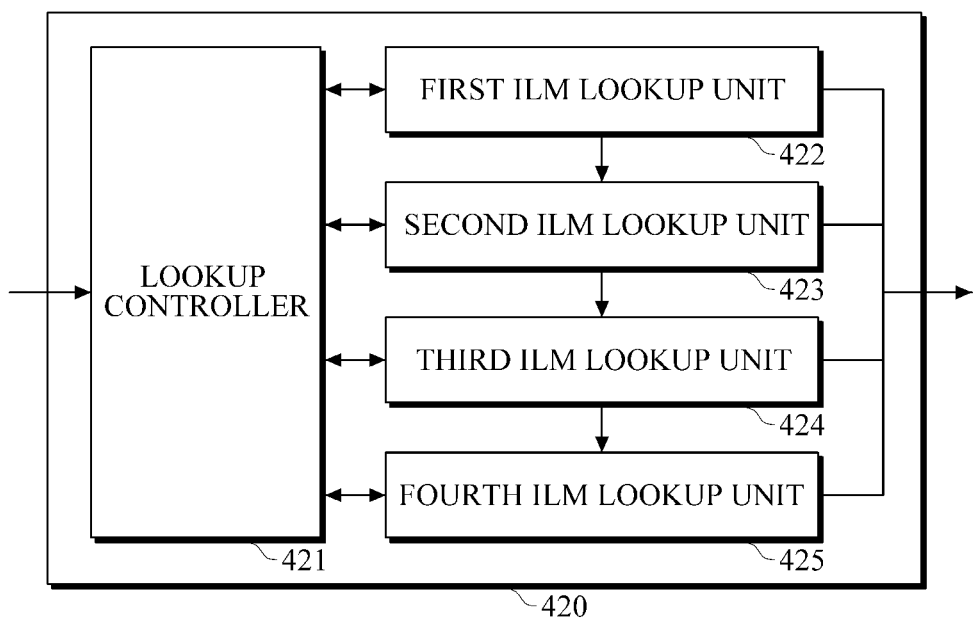
FIG. 5 is a detailed block diagram of an incoming label map (ILM) lookup unit of FIG. 4 according to an embodiment of the present invention.

FIG. 5 is a detailed block diagram of the ILM lookup unit 420 of FIG. 4 according to an embodiment of the present invention.

Referring to FIG. 5, the ILM lookup unit 420 includes a lookup controller 421, a first ILM lookup unit 422, a second ILM lookup unit 423, a third ILM lookup unit 424, and a fourth ILM lookup unit 425.

The lookup controller 421 transmits a label key and location information that are key information for an ILM table lookup to the respective ILM lookup units 422 to 425, and determines whether or not to activate a next lookup unit from lookup results of each of the ILM lookup units 422 to 425.

The first ILM lookup unit 422 performs a lookup using the label key received from the lookup controller 421, and extracts PTL index information, an SDT, a new tag, label operation information, and tag control information for other control from the lookup results.

The second ILM lookup unit 423 checks whether the label key received from the lookup controller 421 is valid. When a label operation of the first ILM lookup unit 422 is a pop operation, and the next label key is valid, the second ILM lookup unit 423 performs a lookup, and extracts PTL index information, an SDT, a new tag, label operation information, and tag control information for other control. A pop operation denotes an operation of removing a label.

The third ILM lookup unit 424 checks whether the label key received from the lookup controller 421 is valid. When a label operation of the second ILM lookup unit 423 is a pop operation, and the next label key is valid, the third ILM lookup unit 424 performs a lookup, and extracts PTL index information, an SDT, a new tag, label operation information, and tag control information for other control.

The fourth ILM lookup unit 425 checks whether the label key received from the lookup controller 421 is valid. When a label operation of the third ILM lookup unit 424 is a pop operation, and the next label key is valid, the fourth ILM lookup unit 425 performs a lookup, and extracts PTL index information, an SDT, a new tag, label operation information, and tag control information for other control.

FIG. 6 shows examples of the header configuration of a packet generated by the loopback control manager 460 of FIG. 4 according to an embodiment of the present invention.

Referring to FIG. 6, a loopback header includes an LS header 610 for an MPLS-TP LS, and an MPOP header 620 for MPOP. The LS header 610 and the MPOP header 620 may have a size of 11 bytes. However, this is merely an embodiment and is not intended to limit the present invention, and it is possible to change the size and the constitution of fields so as to additionally transfer specific information.

In an embodiment, the LS header 610 consists of a copy number field, an original source port field, a next PTL index/indicator field, an original L2 header size field, an added L2 header and MPLS label size field, and an existing swapped label field. The MPOP header 620 consists of a copy number field, an original source port field, an original L2 header size field, an added L2 header and MPLS label size field, a more pop control signal field, and a pop label number field.

FIG. 7A to FIG. 7D are reference diagrams showing lookup tables used by a packet processing apparatus according to various embodiments of the present invention.

FIG. 7A is a reference diagram showing lookup tables used by the FTN lookup unit 430 of FIG. 4 in a packet processing apparatus according to an embodiment of the present invention.

Referring to FIG. 4 and FIG. 7A, a reference numeral 710 denotes results of an FTN lookup performed using input port and C-VID information that is key information, and a reference numeral 720 denotes results of an FTN lookup performed using input port, C-VID, and E-type information that is key information. The FTN lookup unit 430 extracts necessary information from the output results.

A PTL index and PTL index indicator field 712 denotes key information used by the NHLFE lookup unit 450, and the corresponding information can be acquired from all FTN lookup results. When the FTN lookup unit 420 uses E-type information in the output results 720 as key information, it is possible to additionally acquire encapsulation label information as indicated by a reference numeral 721, and when the FTN lookup unit 420 does not use E-type information, encapsulation label information is not acquired as indicated by a reference numeral 711.

In addition, although not described in this embodiment, the lookup tables may be applied to port-based service, input port and S-VID service, and input port and S-MAC service in the same way, so that lookup results can be acquired. Furthermore, an operation of additionally acquiring an encapsulation label when there is E-type information in addition to the aforementioned information, and acquiring no encapsulation label otherwise may also be applied to other service in the same way.

FIG. 7B is a reference diagram showing a lookup table used by the PW FTN lookup unit 440 of FIG. 4 in a packet processing apparatus according to an embodiment of the present invention.

Referring to FIG. 4 and FIG. 7B, a reference numeral 730 denotes results of a PW FTN lookup performed using input port and C-VID information as key information, and the PW FTN lookup unit 440 extracts necessary information from the lookup results. A field 732 of new VIDs for SDT modification shows information acquired by the PW FTN lookup unit 440 to modify a VID value of an SDT.

The PW FTN lookup unit 440 uses no E-type field, which means that an encapsulation label of a network adaptation layer is not used among labels in the MPLS-TP layer 120 of FIG. 1. Also, although not described in this embodiment, the PW FTN lookup unit 440 is able to acquire the same information even when port-based service and input port and S-VID service is basically provided, and other service using additional information is provided.

FIG. 7C is a reference diagram showing a lookup table used by the ILM lookup unit 420 of FIG. 4 in a packet processing apparatus according to an embodiment of the present invention.

Referring to FIG. 4 and FIG. 7C, a reference numeral 740 denotes results of an ILM lookup performed by the ILM lookup unit 420 using input port and label information as key information, and the ILM lookup unit 420 extracts necessary information from the lookup results. According to input label operation, a control field and a search control field of the lookup results vary. For example, lookup results 741 are acquired when an input label operation is a pop operation, lookup results 742 are acquired when an input label operation is a last pop operation, and lookup results 743 are acquired when an input label operation is a swap and push operation. The lookup results 741, 742 and 743 show that acquired pieces of information are different.

FIG. 7D is a reference diagram showing a lookup table used by the NHLFE lookup unit 450 of FIG. 4 in a packet processing apparatus according to an embodiment of the present invention.

Reference numerals 750*a* and 750*b* are embodiments of a lookup table used by the NHLFE lookup unit 450. A reference numeral 751 is a queue index value to be used by the TM 454 that sets and controls QoS, and it is possible to apply policing and shaping to respective queues. Policing and shaping is a method for ensuring QoS.

The lookup tables 750*a* and 750*b* may interoperate with the lookup tables 710, 720, 730 and 740 described above. For example, reference numerals 752*a* and 752*b* show LSs that are passed through the FTN lookup table 711 to have a combination of a control field and a search control field, and passed through two MPLS-TP domains without C-tag or S-tag encapsulation when a C-tagged Ethernet packet is input. Also, the LS 752*a* shows that next PTL indexes and next PTL index indicator values are acquired so that the NHLFE lookup unit 450 can be used again after the LS 752*a* passes through the loopback control manager 460.

Lookup tables 753*a* and 753*b* show that, when an MPLS-TP packet is input, an upper label pop operation of the lookup results 741 in the ILM lookup table 740 and a last pop operation of a label of the lookup results 742 are performed, and then an MPLS-TP label pop operation and C-tag and S-tag encapsulation are performed using a PTL index and a PTL index indicator value acquired from the ILM lookup table 740.

Lookup tables 754*a* and 754*b* show that, when an MPLS-TP packet is input, a swap and push operation of a label of the lookup results 743 in the ILM lookup table 740 is performed, and then an MPLS-TP label swap and push operation is performed using a PTL index and a PTL index indicator value acquired from the ILM lookup table 740.

FIG. 8A to FIG. 8D are flowcharts illustrating a method of processing a packet in the packet processing apparatus 400 according to an embodiment of the present invention.

Figure 8A:
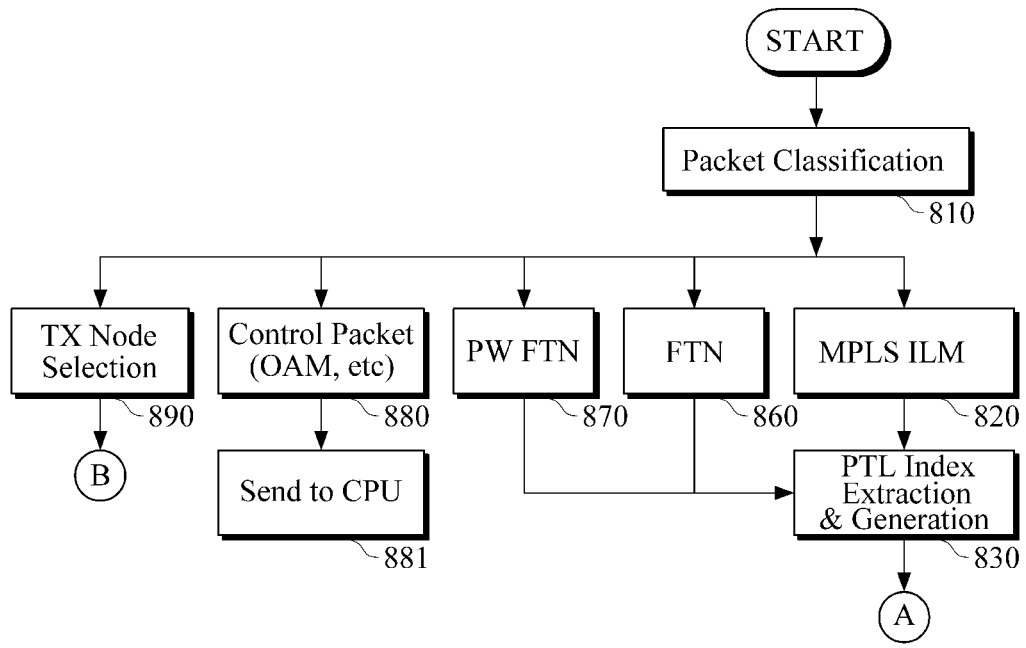
FIG. 8A to FIG. 8D are flowcharts illustrating a method of processing a packet in a packet processing apparatus according to an embodiment of the present invention.

Referring to FIG. 4 and FIG. 8A, the packet processing apparatus 400 classifies an input packet (810). In an embodiment, when the result of packet classification (810) indicates that the input packet is an MPLS packet, an MPLS ILM lookup is performed (820), and when the input packet is an untagged, C-tagged, or S-tagged Ethernet packet, an FTN lookup is performed (860). On the other hand, when the input packet is an untagged, C-tagged, or S-tagged Ethernet packet, and a PW control signal is activated, a PW FTN lookup is performed (870). After performing operations 820, 860 or 870, the packet processing apparatus 400 extracts or generates a PTL index from the lookup results (830), and performs operation A. Operation A will be described later with reference to FIG. 8B.

In another embodiment, when the result of packet classification (810) indicates that the input packet is a control packet such as an MPLS OAM packet or a Sync-E packet, the packet processing apparatus 400 processes the control packet (880), and then transfers the processed packet to a CPU (881). At this time, when the input packet is an MPLS-TP OAM packet, an OAM packet process may be performed, and then the processed packet may be transferred to the CPU. In still another embodiment, when the result of packet classification (810) indicates that the input packet is a transmission packet, the packet processing apparatus 400 selects an output node (890) and performs operation B. Operation B will be described later with reference to FIG. 8C.

Figure 8B:
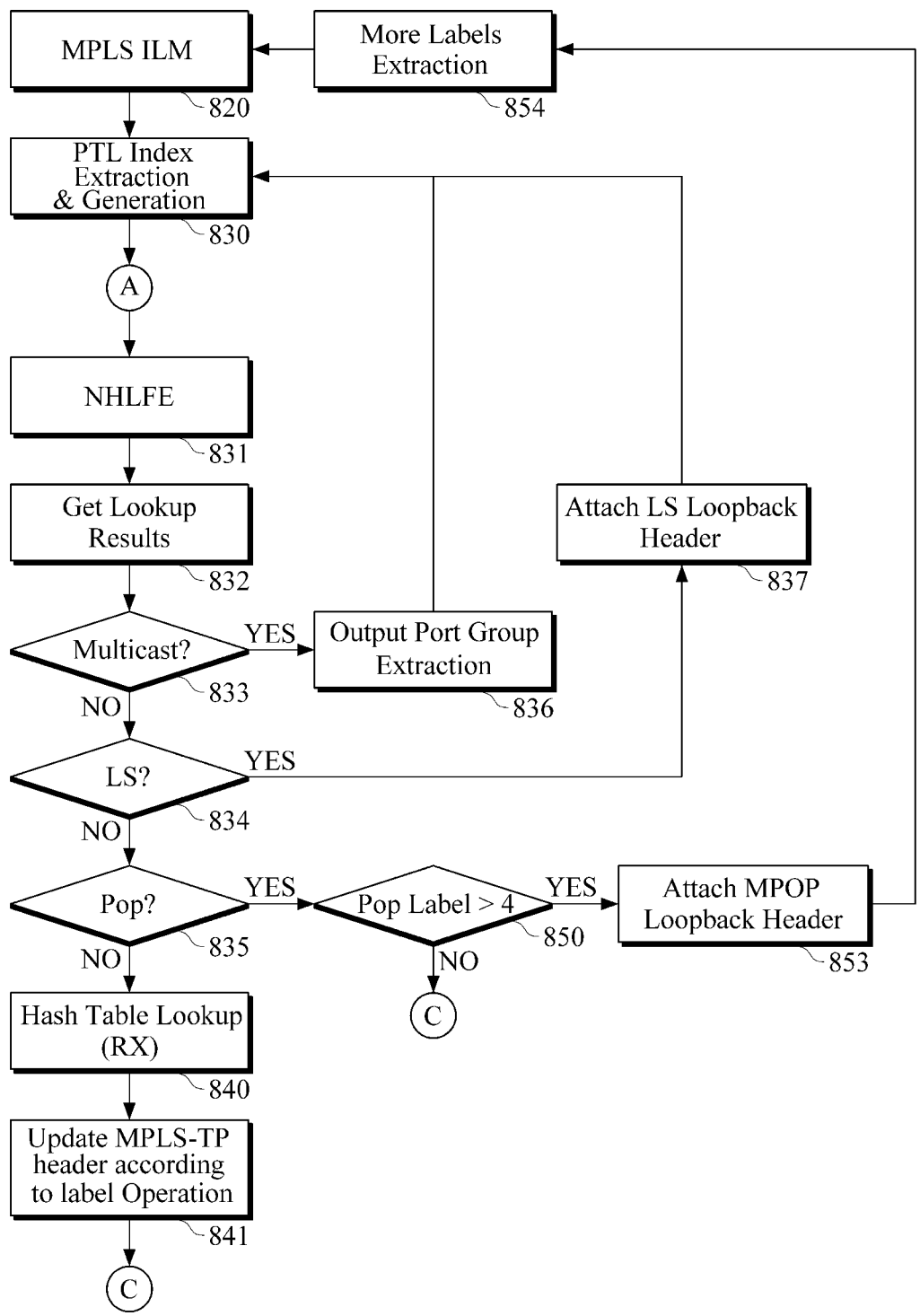

Referring to FIG. 4 and FIG. 8B, after extracting or generating a PTL index (830), the packet processing apparatus 400 performs an NHLFE lookup for determining a next hop (831), and acquires service-specific lookup results (832).

Subsequently, the packet processing apparatus 400 checks whether the input packet is a multicast packet (833). When the input packet is a multicast packet, the packet processing apparatus 400 extracts an O-port group (836), and extracts O-port-specific PTL indexes through loopback (830). On the other hand, when the input packet is not a multicast packet, the packet processing apparatus 400 checks whether an LS has been generated (834). When an LS has been generated, the packet processing apparatus 400 generates an LS loopback header (837), encapsulates the loopback header, and then extracts a next PTL index (830). On the other hand, when the result of the check operation (834) indicates that no LS has been generated, the packet processing apparatus 400 checks whether a label operation is a pop operation (835). When the label operation is a pop operation, the packet processing apparatus 400 checks whether the number of labels on which the pop operation is performed exceeds a predetermined number (e.g., four) (850).

When it is checked in the check operation (850) that the number of labels on which the pop operation is performed exceeds the predetermined number (e.g., four), the packet processing apparatus 400 generates an MPOP loopback header (853), encapsulates the loopback header, extracts an additional label key (854), and then performs an MPLS ILM lookup using the newly extracted label key (820). On the other hand, when it is checked in the check operation (850) that the number of labels on which the pop operation is performed does not exceed the predetermined number, the packet processing apparatus 400 performs operation C. Operation C will be described later with reference to FIG. 8D.

Meanwhile, when it is checked in the operation of checking whether the label operation is a pop operation (835) that the label operation is not a pop operation, the packet processing apparatus 400 performs a hash table lookup for QoS setting (840), and updates an MPLS-TP header according to the label operation (841). For example, when the label operation is a swap operation, the packet processing apparatus 400 decrements label swap and TTL fields by 1. When the label operation is a swap and push operation, the packet processing apparatus 400 decrements label swap and TTL fields by 1 and performs a label push operation. When the label operation is a push operation, the packet processing apparatus 400 pushes acquired MPLS-TP label information.

Figure 8C:
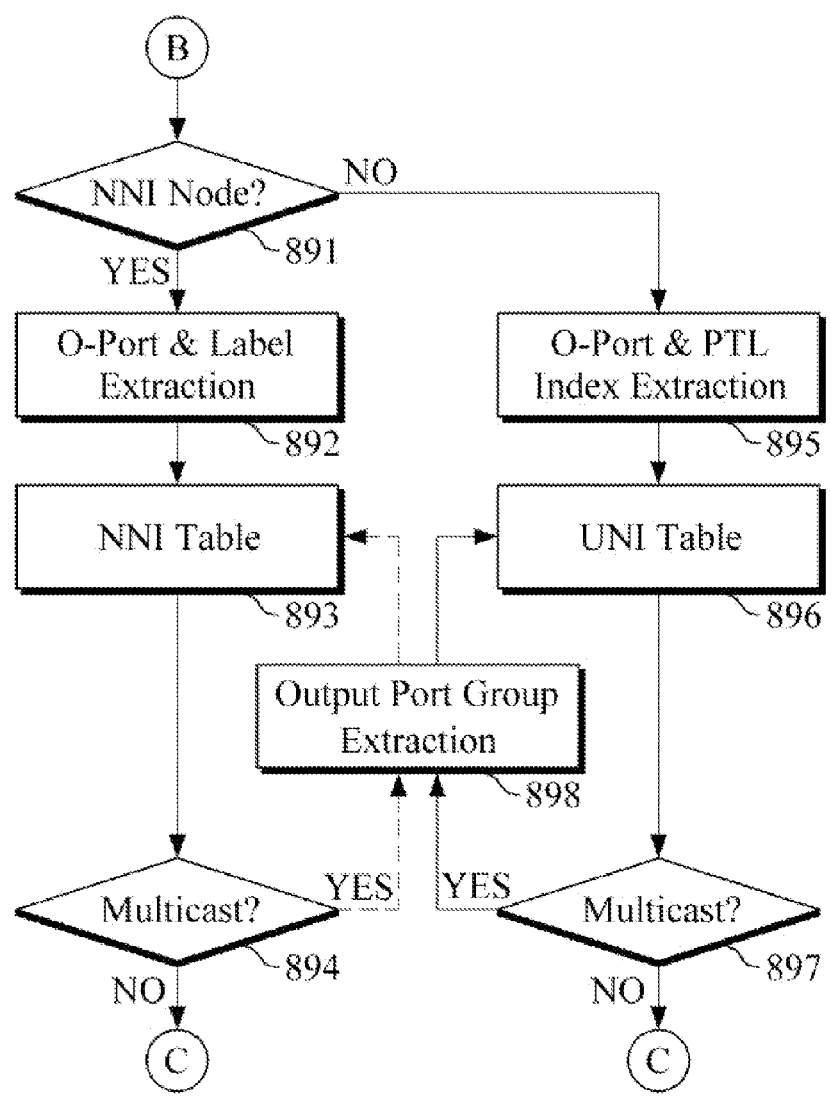

Referring to FIG. 4 and FIG. 8C, the packet processing apparatus 400 checks whether the output node selected in the output node selection operation (890) is an NNI node (891). When the output node is an NNI node, the packet processing apparatus 400 extracts an O-port and an MPLS-TP top label (892), and performs an NNI table lookup (893). Subsequently, the packet processing apparatus 400 checks whether the transmission packet is a multicast packet (894). When the transmission packet is a multicast packet, the packet processing apparatus 400 extracts an O-port group (898). On the other hand, when the transmission packet is not a multicast packet, the packet processing apparatus 400 performs operation C. Operation C will be described below with reference to FIG. 8D.

Figure 8D:
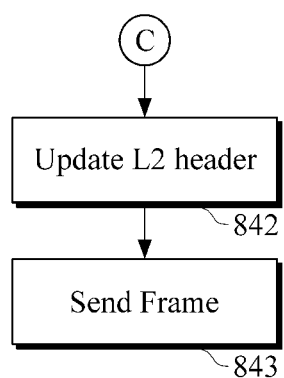

Referring to FIG. 4 and FIG. 8D, in operation C, the packet processing apparatus 400 updates an L2 header (842), and transmits a newly encapsulated packet to another network (843).

According to an embodiment of the present invention, a PTL index and an LS or MPOP loopback header are used in an MPLS-TP network for interoperation with a customer network, a PB network and an existing MPLS network, and transmitting a pseudo-wire emulation edge-to-edge (PWE3) service packet, and it is possible to remove a size limitation on lookup results of a lookup table when multiple labels are stacked, and solve the problem of having to extract all labels as label keys regardless of label operations upon an ILM table lookup.

Furthermore, PTL-index-specific service is generated and managed using data link layer information, and it is possible to readily provide functions of service-specific path management and protection switching, QoS management, management of statistics, connection admission control, system administration and management, and so on.

The present invention can be implemented as computer readable codes in a computer readable record medium. The computer readable record medium includes all types of record media in which computer readable data is stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of processing a packet in a multi-protocol label switching-transport profile (MPLS-TP) network, comprising:

classifying an input packet, and extracting or generating at least a packet transport layer (PTL) index through a lookup according to the classification result;

performing a lookup for determining a next hop using the extracted or generated PTL index, and acquiring service-specific lookup results;

checking whether the input packet is a multicast packet, transmitting the packet after extracting an output (O)-port group from the input packet and extracting O-port-specific PTL indexes through loopback when the input packet is a multicast packet, and checking whether an LS has been generated when the input packet is not a multicast packet; and when it is checked that an LS has been generated, transmitting the packet after generating the LS loopback header, encapsulating the generated LS loopback header, and extracting a next PTL index, and when it is checked that no LS has been generated, checking whether a label operation is a label pop operation.

2. The method of claim 1, wherein the extracting or generating of at least the PTL index includes:
when the classification result indicates that the input packet is an MPLS packet, performing an MPLS incoming label map (ILM) table lookup;
when the input packet is an Ethernet packet including at least one of no tag, a customer (C)-tag or a service (S)-tag, and a pseudo-wire (PW) control signal is in an inactive state, performing a forwarding equivalence class (FEC)-to-next hop label forwarding entry (NHLFE) map (FTN) table lookup; and
when the input packet is an Ethernet packet including no tag, a C-tag or an S-tag, and the PW control signal is in an active state, performing a PW FTN table lookup.

3. The method of claim 2, wherein the performing of the MPLS ILM table lookup includes performing the MPLS ILM table lookup using input port information and MPLS label information extracted from the input packet to acquire lookup results, and acquiring at least one of the PTL index that is a parameter value for ensuring the LSP and quality of service (QoS), a service delimiting tag (SDT), a new tag, MPLS control information, and tag control information for other control from the acquired lookup results.

4. The method of claim 2, wherein the performing of the FTN table lookup includes performing the FTN table lookup using input port information, customer virtual local area network (VLAN) identifier (C-VID) information, service provider VLAN ID (S-VID) information, source media access control (S-MAC) address information, and ether (E)-type information to acquire lookup results, and acquiring other control signals including the PTL index and encapsulation LSP (ELSP) validity information, and an ELSP label from the acquired lookup results.

5. The method of claim 2, wherein the performing of the PW FTN table lookup includes performing the PW FTN table lookup using input port information, customer virtual local area network (VLAN) identifier (C-VID) information, and service provider VLAN ID (S-VID) information to acquire lookup results, and acquiring the PTL index that is a parameter value for ensuring the LSP and quality of service (QoS), and tag control information for other control.

6. The method of claim 1, wherein the performing of the lookup for determining the next hop and the acquiring of the service specific lookup results include performing a next hop label forwarding entry (NHLFE) table lookup using the PTL index to acquire lookup results, and acquiring at least one of traffic manager (TM) header information, switching fabric and output port (O-port) information, tag value information, TM queue index information, tag control information, information on a service LSP (SLSP) label related to an MPLS-TP layer, transport LSP (TLSP) label information, experimental (EXP) information, stack bit information, time-to-live (TTL) information, PTL index information, destination media access control (D-MAC) identifier (ID) or multicast ID (M-ID) information, and label control information using the PTL index.

7. The method of claim 1 further comprising:
encapsulating, decapsulating, or replacing MPLS-TP layer labels, inserting a tag according to a configuration of a destination network, and inserting, removing, or modifying a tag according to an SDT upon provision of pseudo-wire (PW) adaptation service so that the packet is transmitted to a destination edge node through the LSP in the MPLS-TP network.

8. The method of claim 1 further comprising:
when the label operation is a label pop operation, checking whether a number of labels on which the label pop operation is performed exceeds a predetermined number, and when the number exceeds the predetermined number, updating a layer 2 (L2) header and transmitting the packet after generating the MPOP loopback header, extracting an additional label key, and performing an incoming label map (ILM) lookup using the extracted label key; and
when the label operation is not a label pop operation, performing a hash table lookup for ensuring quality of service (QoS), updating an MPLS-TP header according to each label operation, updating the L2 header, and transmitting the packet.

9. The method of claim 1, further comprising, when the input packet is a control packet, processing the control packet, and transmitting the processed control packet to a central processing unit (CPU),
wherein the processing of the control packet, and the transmitting of the processed control packet to the CPU include, when the input packet is an MPLS-TP operation, administration and maintenance (OAM) packet among control packets, performing OAM packet processing, and then transmitting the MPLS-TP OAM packet to the CPU.

10. The method of claim 1, further comprising, when the input packet is a transmission packet, selecting an egress provider edge (PE) node, and outputting the input packet through the selected egress PE node.

11. The method of claim 10, wherein the outputting of the input packet includes:
determining whether an output node is a network-to-network interface (NNI) node or a user-to-network interface (UNI) node, and selecting the egress PE node;
when the output node is an NNI node, extracting an output (O)-port and an MPLS-TP top label, and performing an NNI table lookup, and when the input packet is a multicast packet, extracting an O-port group, and then outputting the packet; and
when the output node is not a UNI node, extracting an O-port and a PTL index, and performing a UNI table lookup, and when the input packet is a multicast packet, extracting an O-port group, and then outputting the packet.

12. An apparatus for processing a packet in a multi-protocol label switching-transport profile (MPLS-TP) network, comprising:
a packet classifier configured to classify an input packet;
a lookup unit configured to extract or generate at least a packet transport layer (PTL) index by performing a lookup according to the classification result, and acquire service-specific lookup results by performing a lookup for determining a next hop using the extracted or generated PTL index; and
a packet processor configured to perform: checking whether the input packet is a multicast packet; transmitting the packet after extracting an output (O)-port group from the input packet; extracting O-port-specific PTL indexes through loopback when the input packet is a multicast packet; checking whether an LS has been generated when the input packet is not a multicast packet; when it is checked that an LS has been generated, transmitting the packet after generating the LS loopback header; encapsulating the generated LS loopback header; extracting a next PTL index; and, when it is checked that no LS has been generated, checking whether a label operation is a label pop operation.

13. The apparatus of claim 12, wherein the packet classifier analyzes and classifies the input packet as a control packet or a general packet, and classifies a service type of the input packet with reference to a type field, a source media access control (S-MAC) address, a customer virtual local area network (VLAN) identifier (C-VID) tag, a service provider VLAN ID (S-VID) tag, MPLS label and input port information, and predetermined port-specific service configurations.

14. The apparatus of claim 12, wherein the lookup unit includes an incoming label map (ILM) lookup unit configured to generate and manage service using input port information and MPLS label information extracted from the input packet by the packet classifier, and acquire at least one of the PTL index that is a parameter value for ensuring the LSP and quality of service (QoS), a service delimiting tag (SDT), a new tag, MPLS control information, and tag control information for other control through an MPLS ILM table lookup.

15. The apparatus of claim 12, wherein the lookup unit includes a forwarding equivalence class (FEC)-to-next hop label forwarding entry (NHLFE) map (FTN) lookup unit configured to generate and manage service using at least one of input port information, a customer virtual local area network (VLAN) identifier (C-VID), a service provider VLAN ID (S-VID), a source media access control (S-MAC) address, and ether (E)-type information extracted from the input packet by the packet classifier, and acquire other control signals including the PTL index that is a parameter value for ensuring the LSP and quality of service (QoS), and encapsulation LSP (ELSP) validity information, and an ELSP label through a forwarding equivalence class (FEC) table lookup.

16. The apparatus of claim 12, wherein the lookup unit includes a pseudo-wire (PW) forwarding equivalence class (FEC)-to-next hop label forwarding entry (NHLFE) map (FTN) lookup unit configured to generate and manage service using at least one of input port information, customer virtual local area network (VLAN) identifier (C-VID) information and service provider VLAN ID (S-VID) information extracted from the input packet by the packet classifier, and acquire the PTL index that is a parameter value for ensuring the LSP and quality of service (QoS), and tag control information for other control through a PW FEC table lookup.

17. The apparatus of claim 12, wherein the lookup unit includes a next hop label forwarding entry (NHLFE) lookup unit configured to generate and manage service using the PTL index as key information, and acquire at least one of traffic manager (TM) header information, switching fabric and output (O)-port information, tag value information, TM queue index information, tag control information, information on a service LSP (SLSP) label related to an MPLS-TP layer, transport LSP (TLSP) label information, experimental (EXP) information, stack bit information, time-to-live (TTL) information, PTL index information, destination media access control (D-MAC) identifier (ID) or multicast ID (M-ID) information, and label control information through an NHLFE table lookup.

18. The apparatus of claim 12, further comprising a loopback control manager configured to generate a layer stack (LS) loopback header when the apparatus is located in a plurality of MPLS-TP domains, and an MPLS-TP LS is generated, and generate a multiple label pop (MPOP) loopback header when an MPOP operation occurs.

* * * * *